Patented Oct. 19, 1937

2,095,993

UNITED STATES PATENT OFFICE 2,095,993

MANGANESE PHOSPHATE FERTILIZER

Walter H. MacIntire, Knoxville, Tenn.

No Drawing. Application June 22, 1935,
Serial No. 28,023

3 Claims. (Cl. 71—2)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to fertilizer compositions containing manganese in a form available as plant food.

One of the objects of this invention is to produce a fertilizer composition which contains more than one essential element of plant food, one of which is manganese. Another object of this invention is to produce a fertilizer composition containing manganese as an essential element of plant food and uncombined with other elements, such as chlorine or sulfur, which may be undesirable for the fertilization of certain crops, especially tobacco. Other objects of this invention include the production of fertilizer composition, containing more than one element of plant food, in which the manganese present is in a soluble form.

Concentrated superphosphates, usually called triple superphosphates, have been made from dolomite, limestone and phosphate rock, by reaction of these materials with phosphoric acid, by a variety of processes. One of the oldest methods for preparing superphosphates is by the treatment of phosphate rock with sulfuric acid. However, any phosphate which contains a substantial proportion of phosphorus in a form available as plant food and which is a proper fertilizer composition may be properly termed a superphosphate. Soils requiring a manganese supplement to one or more of the commonly considered essential elements of plant food have had this supplement supplied, in most instances, by the addition of the required quantity of manganese sulfate, which is not advantageous for application in connection with certain types of crops.

In my co-pending application, Ser. No. 28,025, filed June 22, 1935, Making manganese phosphate, I have described and claimed the process of making a soluble manganese salt which may be used in place of the manganese sulfate without the undesirable effects produced by the latter.

In my co-pending application, Ser. No. 28,024, filed June 22, 1935, Making manganese phosphate fertilizer, I have described and claimed the process of making a phosphatic fertilizer which may be used in place of combining the use of superphosphates and manganese sulfate without the undesirable effects produced by the latter.

I have produced a new fertilizer composition, for use on those soils that require manganese as an essential fertilizer element, by incorporating an available manganese phosphate with commercial superphosphates or by making a superphosphate so that the resulting product contains an available manganese phosphate.

One example is given to show the operation of my invention. 672.4 parts by weight of 87.5% phosphoric acid are added to 338.5 parts by weight of rhodochrosite of less than 300 mesh, containing 84.3% $MnCO_3$, 8.91 $MgCO_3$, 3.57% $CaCO_3$, 2.06% $Fe_2O_3$ and $Al_2O_3$ and 0.65% $SiO_2$, are added and the mixture vigorously agitated until a creamy suspension is formed. The mixing proceeds for ten to fifteen minutes before any marked change in appearance of the mixture is evident. The creamy suspension contains some partially reacted material mixed with the unreacted rhodochrosite and concentrated phosphoric acid impregnated with carbon dioxide. This gas-distended body collapses in sixteen hours or less into a mass containing crystals of mono-manganese phosphate and some undecomposed rhodochrosite and some free phosphoric acid. Upon further standing the mixture gradually becomes a mass of damp crystals resembling a corresponding bulk of magnesium chloride. At the end of a curing period of three weeks there is obtained 900 parts by weight of a slightly hygroscopic mixture consisting substantially of crystalline mono-manganese phosphate. This mono-manganese phosphate is mixed with equal parts by weight of triple superphosphate to form a manganese phosphate composition very rich in water-soluble manganese.

Another example is given to show the operation of my invention. A uniform mixture of 203 parts by weight of brown Tennessee phosphate rock, containing 76.2% $Ca_3(PO_4)_2$ equivalent and 37.8 parts by weight of rhodochrosite of less than 325 mesh, containing 84.3% $MnCO_3$, 8.9% $MgCO_3$, with 324.3 parts by weight of phosphoric acid containing 75% $H_3PO_4$. The granular mixture resulting is cured for three weeks and a product of 534 parts by weight of a manganese containing triple superphosphate is obtained. This triple superphosphate contains 3.2% water-soluble manganese, calculated as $Mn_3O_4$, which is equivalent to 12% manganese phosphate.

It is evident that there are numerous factors which will influence conditions for the most satisfactory production and use of the compositions covered by this invention, the actual limits of which cannot be established except by detailed study of each set of raw materials and finished products involved. Superphosphate means and includes any phosphatic fertilizer containing at least 16% $P_2O_5$ equivalent available as plant food. Available manganese phosphate means and includes any manganese phosphate in which the manganese is available as plant food, such as mono-manganese phosphate, $MnH_4(PO_4)_2.2H_2O$, di-manganese phosphate, $MnHPO_4.3H_2O$, and ammonium manganese phosphate, $$NH_4MnPO_4.H_2O.$$

The manganese phosphate fertilizer may contain a very high proportion of available manganese phosphate where it is principally desirable to supply the manganese deficiency in certain types of soils or substantial proportions of other superphosphates may be used with relatively small proportions of an available $MnPO_4$ where it is desired to supply a small manganese supplement, along with the usual application of those fertilizer elements which are more commonly considered essential to plant growth.

It will be seen, therefore, that this invention actually may be carried out with the modification of certain details without departing from its spirit or scope.

I claim:

1. A fertilizer containing manganese as an essential element, which comprises a superphosphate, and mono-manganese phosphate.

2. A fertilizer containing manganese as an essential element, which comprises a superphosphate, and ammonium manganese phosphate.

3. A superphosphate fertilizer containing manganese as an essential element in the form of an available manganese phosphate.

WALTER H. MacINTIRE.